Sept. 3, 1946.                E. A. STALKER                2,406,920
                                  WING
                         Filed Feb. 19, 1941            3 Sheets-Sheet 1

INVENTOR.
Edward A. Stalker

Sept. 3, 1946.  E. A. STALKER  2,406,920
WING
Filed Feb. 19, 1941  3 Sheets-Sheet 2

INVENTOR.
Edward A. Stalker

Patented Sept. 3, 1946

2,406,920

UNITED STATES PATENT OFFICE 2,406,920

WING

Edward A. Stalker, Ann Arbor, Mich.

Application February 19, 1941, Serial No. 379,812
In Canada October 30, 1940

22 Claims. (Cl. 244—42)

My invention relates to a means of controlling the boundary layer on wings. In particular it relates to wings having slots in their surfaces through which the boundary layer may be influenced. It has for its objects first, to provide efficient means of increasing the maximum lift of wings, second, to provide a means of obtaining low drag for a wing equipped to obtain high lifting capacity, and third to provide a wing having special slot proportions so as to obtain both a low drag and high lift. Other objects will appear from the specification and drawings.

This application is a continuation in part of my prior application Serial No. 304,188 in which division was required. It also contains some material similar to that in my application Serial No. 313,967. It differs from the latter application in that it concerns chiefly specific proportions of the airfoil section of the wing.

I accomplish these objects by the means illustrated in the accompanying drawings in which—

It is well known in aerodynamics that the maximum lift coefficient of wings can be greatly increased by a slot in the upper surface of a wing through which the boundary layer is inducted. By this means experimenters have achieved lift coefficients of the order of 5.6 on very thick wings. These wings were very thick of the order of 30 to 50 per cent of the chord length. These wings have not come into use because the drag of such thick sections is too great. In fact even with such high lift coefficients ($C_L$) the ratio of maximum lift to minimum drag is not as high as for wings now in use.

On thinner wings, the thickness of the order of 20 per cent of the chord length, the lift coefficient has not exceeded 3.5 for wings of finite span so that the ratio of maximum lift to minimum drag has not been high enough to bring these wings into use. This ratio is called the speed ratio since it determines the ratio of maximum speed to landing speed.

The applicant has devised wings as thin as 12 per cent of the chord length which have attained lift coefficients of 6.0 so that the speed ratio is some three times the present day conventional wing. Furthermore the power requirement for the blower is reduced to practical values.

An important feature of this invention then is the special shape and form of the wing to bring about this large increase in speed ratio for thin wings.

Another important feature is the means of reducing the drag on such thin wings even further by the slots and their flows, and in particular the combination of the high lift device with the low drag device. Still another feature is to make the combination in such a manner as to reduce the power required for the blower.

Briefly the wings are composed of a main body and special flaps so that the upper contour of the wing section has a scalloped appearance. When the flap or flaps are depressed the upper contour of the wing becomes highly cambered with a curvature of great radius due to the registration of successive upper camber arcs or extradoses with the adjacent one. It is important also that the mean camber line take up a high arching, even much beyond present day practice. This makes possible the great increase in $C_L$ maximum with a thin wing.

The drag is reduced for even the thin wing by slots spaced along the chord to maintain a laminar flow. The wing and the wing segments between slots may take a special form to facilitate this condition.

It is shown also that the condition for maintaining minimum drag is normally incompatible with the boundary layer condition for minimum blower power used for maximum lift. A feature of this invention is the means to resolve this incompatibility.

Figures 1, 1C, 1D, 2:
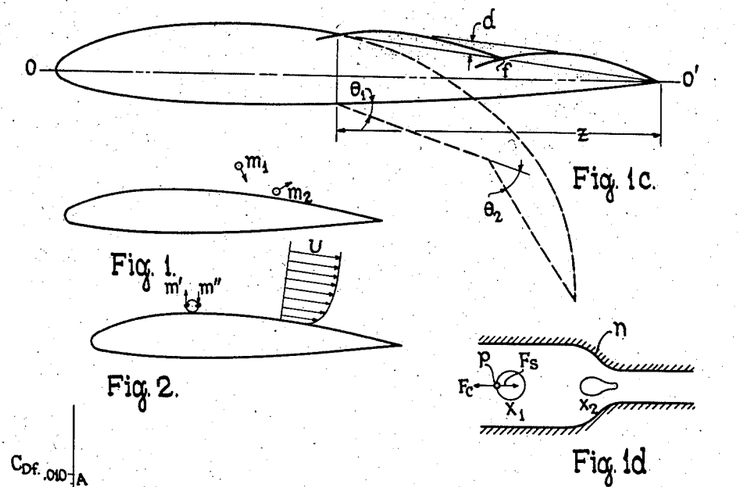
Figures 1, 1a, 1b, 1c, 1d, 2, 3 and 10 pertain to the theory.
Figures 1A, 8A:
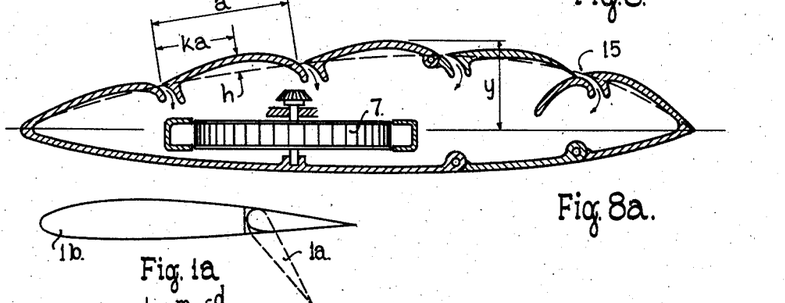
Figure 8a is a section along line 8—8 in Figure 9 showing an alternate form.

Referring to Figure 1a it is to be noted that rotating the flap 1a down gives an abrupt change in contour near the juncture of flap and main body 1b. With this type of flap the flow will not follow the surface and hence high lift cannot be developed.

Figure 1B:
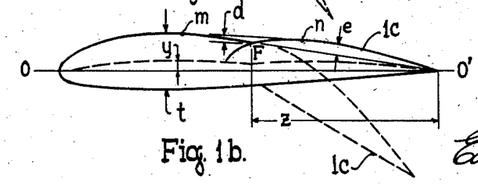

Referring to Figure 1b it will be observed that the flap 1c when depressed will give a large radius of curvature to the upper contour bathed by the flow passing over the upper surface of the main body. With two flaps the amount of mean camber could be increased and the radius of curvature still maintained at a high value.

The type of flap can be defined in terms of the depression ordinate $d$ measured downward from the tangent $mn$ to the upper extradoses of the wing contour or it may be defined in terms of the rise $e$ above the local chord subtending the extrados.

The magnitude of the minimum radius of curvature with the flap depressed is a function of the distance $mn$ and the depression ordinate $d$. The greater the value of $mn$ (within the structural limitations of the wing) the greater can be the radius of curvature for a proper value of $d$ or rise $e$.

It will be observed from Figure 1b that the distance $mn$ will determine along with $d$ the magnitude of the curvature of the depressed flap. To make these lengths non-dimensional and applicable to wings of any size they are expressed as percentages of the wing chord.

The thicker the wing the smaller can be the dimensions $d$ and $mn$. Also the greater the number of flaps the smaller these can be.

For a thin wing with one flap the value of $d$ should be between 5.5 per cent and 100 per cent of the dimension $mn$. A preferred value is 12 per cent. For a thin wing with two flaps I prefer a value of about 8 per cent for $mn$ greater than 14 per cent of the wing chord and the limits would be 1.5 per cent to 100 per cent for $d$. A value substantially below 5.5 per cent and 1.5 per cent would not be significant for their respective wings.

The dimension $mn$ is best expressed as a percentage of the wing chord. It should be between 20 per cent and 90 per cent of the wing chord length.

The preferred depression ordinate $d$ should vary as an inverse function of the thickness of the wing. For a wing whose maximum thickness is 12 per cent of the chord length the depression ordinate $d$ should be preferably 25 per cent of the wing maximum thickness for two flaps and a concavity for each. This ordinate should be greater than 4.5 per cent and less than 80 per cent of the wing maximum thickness for one or more flaps.

In a wing having a thickness of 12 per cent of the chord and two flaps and two depressions I prefer a magnitude $d$ of about 8 per cent of the chord subtending the rear adjacent arc. Thus in Figure 1b the ordinate $d$ is 8.7 per cent of the sub-chord $FO^1$.

In some cases I prefer to define the concavities in terms of the envelope drawn about the wing section. The envelope should avoid the wing section arcuate segments along the major portion of the length of these segments.

If the slot occurs at the bottom of the concavity the depression ordinate $d$ is to be measured to a line drawn across the slot exterior opening normal to the slot axis.

The flap or flaps should preferably provide a maximum mean camber ordinate with the flap down, substantially greater than 18 per cent and preferably in combination with a thickness less than 20 per cent of the chord length.

It has never been demonstrated before that a thin wing of either infinite or finite span could develop a maximum lift coefficient of the order of 5.6. With the type of flaps I provide this has been achieved. It is an important feature of the invention that the maximum camber ordinate exceed 18 per cent of the chord length in order to accomplish this great augmentation of the maximum lift coefficient.

The wing should also have the rear flap set down at a greater angle to the preceding flap than the latter has to the portion of the wing ahead of it. That is the angular depression of each flap increases successively toward the trailing edge of the wing. In Figure 5 for instance the rear flap 6 makes a greater angle with flap 6a than the latter does with the forebody 3.

It is to be noted that each arcuate segment or extrados has a point raised highest above its ends and that this point lies substantially above the line joining the nearest end of the adjacent arcuate segment to the end of the first said segment on the opposite side of the said point. If there is a slot between the segments then the line is joined to the end of the contour at the far side of the slot.

The devices for reducing the power consumption for the blower will now be discussed together with their relation to the minimum drag of the wing.

The failure of the conventional wing to continue producing lift with increasing angle of attack is due to the low rearward velocity in the boundary layer. When it is sucked into the wing a higher velocity layer is brought next to the surface and it can cling to it over a certain distance—until its velocity is reduced to a certain value.

In flight the layer brought down to the surface is laminar or non-turbulent in character, of a velocity high relative to that which existed in the boundary layer before it was removed. Removing the layer is only one method of obtaining a high velocity near the surface and it requires power.

Still another method of obtaining a high velocity adjacent the wing surface is to have a fine grain turbulence in the boundary layer flow. Then as shown in Figure 1 a mass $m_1$ of high velocity is injected into the boundary layer and a mass $m_2$ of low velocity is ejected. Of course the action is random but the net result of the turbulence is to increase the rearward momentum of the flow in the boundary layer and it must be high if the flow is to pass rearward down the wing surface at large angles of attack when there is a high suction above the wing nose tending to cause a reversal of flow in the layer.

Following the practice now well established in the science of aerodynamics I use the term turbulence to refer to small scale mixing such as occurs in the boundary layer and not to the large scale eddies which occur behind a blunt end of a body or upon the wing when it has burbled.

Atmospheric air above the ground obstructions has been shown to be non-turbulent although it may have large scale disturbances in the form of gusts or large eddies.

When fluid has flowed far enough along a surface it creates its own turbulence by rolling up vortices between the main stream and the surface of the body.

This is a form of turbulence which transports momentum into the boundary layer. In Figure 2 the particle $m^1$ of little momentum is being moved up while the particle $m''$ of large momentum is being transferred into the boundary layer. Particle $m''$ has a high rearward momentum since it is coming from above where the rearward velocity is high as indicated by the velocity gradient shown in Figure 2. It shows the velocity U at various levels above the surface.

If turbulence is introduced into the flow on a wing the amount of power required by the blower used to induct the boundary layer will be greatly reduced since it will be thinner or less retarded immediately above the surface. For this reason the slots should be well back on the chord to give the flow on the forward part sufficient distance in which to develop turbulence (but not eddies). Actually the incidence of turbulence also depends on the velocity and the viscosity as well as the distance. That is it is dependent on the Reynolds number which is $$R = \frac{Vl}{\nu}$$

where $l$ is the distance, V is the velocity and $\nu$ (nu) is the coefficient of kinematic viscosity. It has the value 0.000159 in the pound foot second system for standard air.

Figure 3:
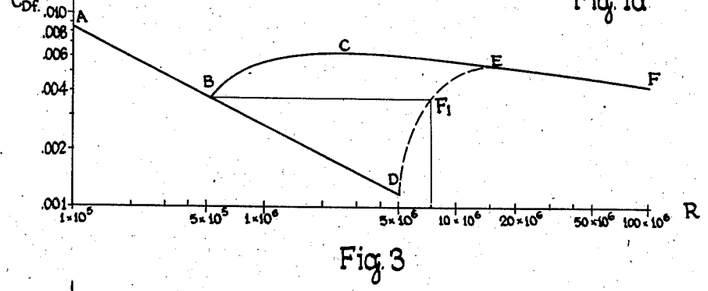

Figure 3 shows how turbulence is dependent on this number. The abscissa is R and the ordinate is the frictional coefficient of resistance of the surface $C_{Df}$ both plotted to log scales. From A to B the flow is non-turbulent or laminar. From B to C the flow is laminar along the first part of a body surface and turbulent on the aft part while beyond C it is all turbulent. If suction slots are present the laminar flow can be maintained until D beyond which it again becomes turbulent.

For high speed the wing has the flap in the retracted position because this is the attitude for minimum drag.

For landing speed the wing has the flap in the depressed position to provide the maximum lift.

If it is desired to use the slots to reduce the drag of the wing they should be spaced so that the boundary layer removal precludes the formation of turbulence. From Figure 3 it may be deduced that the slot spacing should be less than that corresponding to the Reynolds number R at D. If $a$ is the spacing between two slots it should have such a value that $$\frac{Va}{\nu}$$

is less than $5 \times 10^6$ so $a$ must have a value less than $$a = \frac{5 \times 10^6 \nu}{V}$$

If maximum lift is the main consideration turbulence on the fore part of the wing should be provided. In this case the Reynolds number should be greater than $5 \times 10^6$ at D. But this requirement is opposed to that for laminar flow and low drag.

This invention sets forth a slot structure in which the needs of the wing for lift augmentation are harmonized with those for drag reduction.

Figure 4:
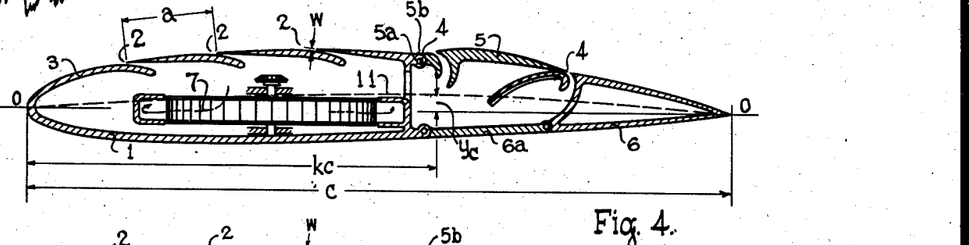
Figure 4 is a cross-section along the line 4—4 of the wing in Figure 6.
Figures 4A, 5, 7:
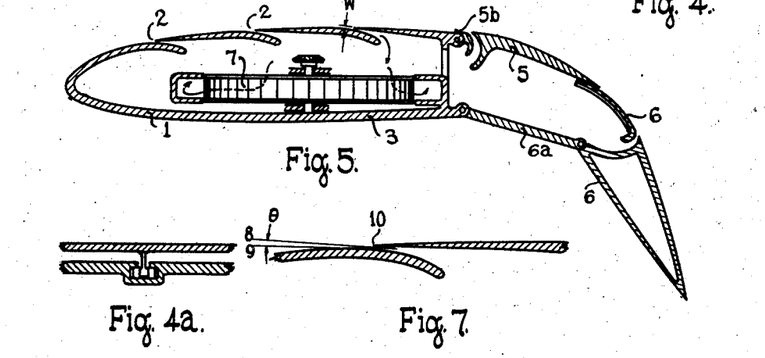
Figure 4a is a fragmentary vertical section along the line 4a—4a in Figure 6.
Figure 5 is the same as Figure 4 with the flap deflected.
Figure 7 is a fragmentary vertical section of the wall of the wing at a slot.
Figure 6:
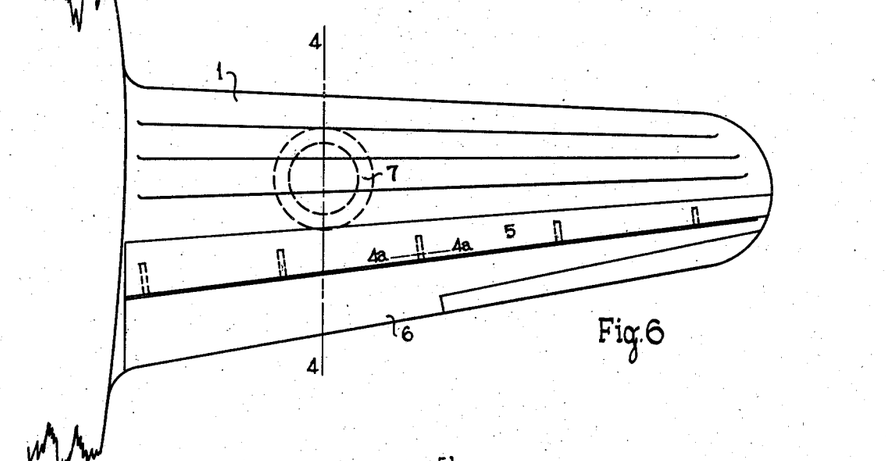
Figure 6 is a top plan of the wing.

In Figure 4 the wing is 1 having the induction slots 2 in the fore body 3 and the slots 4 in the flaps 5 and 6. A blower 7 inducts the air through the slots. For low drag the flaps are retracted as shown in this figure. For high lift the flaps are depressed as shown in Figure 5.

The flap 5 is hinged at 5a and its trailing edge has suitable lugs of T-shape projecting downward and sliding in a T-slot in the flap 6. Figure 4a illustrates the detail. The mechanism for actuating the flaps is not shown since devices are well known in the art for this purpose and the present invention is not concerned with them.

The slots 2 in the fore body are more numerous than those in the flaps and have a smaller width $w$ Figure 4. Furthermore the axis of the slot lies within 40° of the tangent to the upper surface at the slot as shown in Figure 7. The axis line is 8 and the tangent line is 9, the two defining the angle $\theta$ which should be less than 40 degrees for reducing the drag. Preferably $\theta$ should be near zero degrees. The upper edge of the slot should be sharp as indicated at 10. The sum of the width of the slots 2 should be less than 3 per cent of the chord length at a chordwise section and preferably somewhat less than 1 per cent. With the flap retracted and the above slot widths and areas employed the boundary layer is inducted in sufficient quantity to maintain a laminar flow on the surfaces between slots and hence the drag is low.

The sum of the widths of the slots in the flaps when deflected should be less than 11 per cent of the chord length of the wing and preferably about 2 per cent based on the wing chord length when the flap is retracted.

The flaps 5 and 6 are arranged so that upon retraction flap 5 partly covers the slot in flap 6. The slot in flap 5 could also be arranged for reduction of its area by hinging it sufficiently below the upper wall of the fore body.

With these proportions and with the flap depressed the blower 7 inducts air chiefly through the flap slots where it is needed to increase the lift, and the amount being inducted through the fore body slots 2 is not enough to exclude the formation of turbulence. Thus turbulence will appear with the flap depressed and this is desirable since it reduces the power required by the blower.

The pressure distribution over the upper surface of the wing also favors the flow through the flap slots because at high lift there is a high suction over the upper surface of the fore body which opposes the induction of air through its slots.

Hence both the pressure and area of the slots favors the direction of the main flow through the flap slots where it should be for maximum lift.

The distribution of slot width and area is a feature of this invention, as is also their relation to the flap.

Turbulence may be induced into the flow of the wing with flap down by a mechanical means. In Figures 4 and 5 the flap 5 has a projection 5b which is normally below the wing contour when the flap is retracted but projects when the flap is deflected as shown in Figure 5. Such a projection should be followed by a slot to exclude the possibility of the flow separating from the surface. If the projection is used preferably the slot is omitted in the flap 5 but retained in the flap 6.

With the flaps retracted the exterior suction due to the wing shape does not vary greatly in magnitude between the first and last slots so that they each induct an adequate amount of the boundary layer. This is particularly true if the maximum ordinate of the mean camber line of the wing section is well aft on the chord.

In Figure 4 the mean camber line is 11 and the maximum ordinate above the subtending chord 12 is $y_c$. Its location from the nose 0 is $kc$ and while in this construction $k$ is greater than 0.50 in the conventional wing $k$ is ordinarily between 0.30 and 0.50.

The width of the flaps may have any value and should exceed 30 per cent of the chord. I prefer a width of about 50 per cent of the wing chord so that the height of the mean camber ordinate may be very large, preferably about 50 per cent of the chord, achieved with the rear most flap set at 90 degrees to the forebody. The mean camber maximum ordinate may then exceed 50 per cent and with further deflection of the flap can achieve values as high as 60 per cent.

These large flap angles facilitate the production of great lifts and aid in forming boundary layer turbulence over the fore body in spite of its narrow slots which as explained reduces the power consumption of the blower.

The point of transition from laminar to turbulent flow may occur anywhere between B and D Figure 3 and so $F_1$ may also occur earlier since it is a point part way between the curve BCE and the value at the transition point similar to B or D. The location of this point depends on how smooth the wing surface is, how rigid it is to eliminate flutter and the type of surface material. For this reason the range of values in the claims is taken at the ends of a horizontal line $BF_1$ through the point $F_1$.

Figure 10:
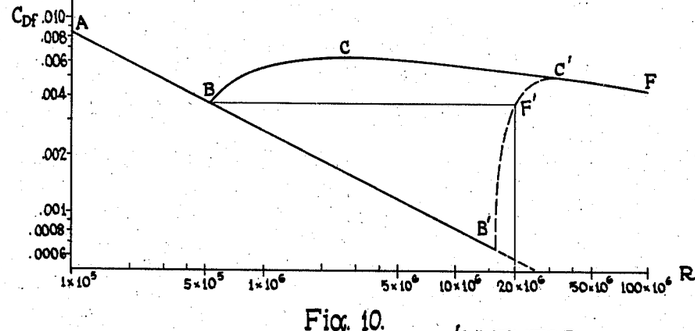

In the preferred form of the invention the maximum ordinate of the mean camber line is aft of the midpoint of the chord. If this position is used the spacing of the slots on the fore body can be increased. Figure 10 indicates the shift to larger Reynolds numbers of the critical point B'. That is the flow can be kept laminar for a greater distance for a given velocity.

Figures 8, 9:
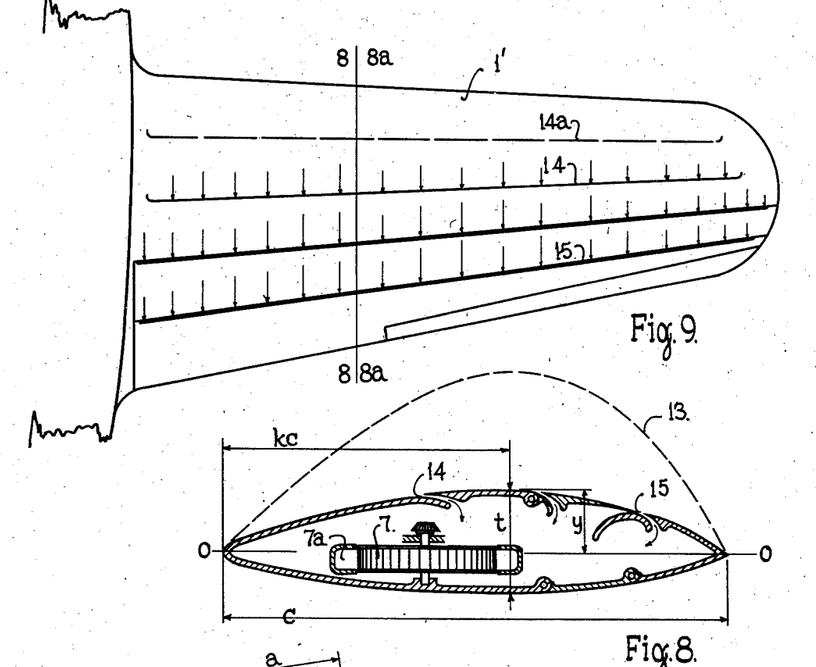
Figure 8 is a section along the line 8—8 in Figure 9.
Figure 9 is a top plan of the wing of the preferred form.

A similar result can be achieved if the camber of the upper surface has its maximum ordinate $y$ well back on the chord. The maximum thickness $t$ should also be far back. Again either should be back of the midpoint of the chord and the preferred values are between 0.50 and 0.80 of the chord. Figure 8 illustrates such a wing. In this case the spacing of the slots in the fore body should be less than $$a = \frac{20,000,000\nu}{V}$$

where V is the flight velocity and for the claims is taken as the landing speed. This is the limit needed to insure laminar flow between slots for retracted flap position.

By placing either the upper surface maximum ordinate $y$ or the mean camber maximum ordinate far back, the whole flow about the wing favors the preservation of the laminar condition on the upper surface between the leading edge and the said ordinate, because the locality of maximum suction is moved rearward. See Figures 8 and 8a. For both cambers the chord line is that subtending the mean camber line. If the mean camber line is a straight line it is the chord of the upper camber of the wing.

With the preferred form of the wing section the pressure distribution for a low angle of attack and a retracted flap position is indicated by the dotted line 13. It will be noted that the peak of the suction curve occurs approximately above the locality of maximum camber of the upper contour. It also corresponds approximately to the location of maximum thickness $t$.

Over the major portion of the fore body there is a favorable pressure gradient, favorable to the maintenance of a laminar flow because the maximum suction ordinate is ahead of the particle and encourages its onward motion. Figure 10 indicates how the transition from laminar to turbulent boundary layer is delayed to higher Reynolds numbers by a favorable pressure gradient. It is to be noted that now the transition point B' is delayed to about 18,000,000 whereas before it occurred at about 500,000.

Thus it is possible to use fewer slots in the fore body and to place the majority of them well back from the leading edge.

The flaps on the wing of Figure 8 function like that on the wing of Figure 4.

For wings of small chord one slot will normally suffice in the surface of the fore body but in very large wings a plurality of slots will be needed and they should be spaced as indicated in Figure 8a where the value of $a$ lies between $$a = \frac{500,000\nu}{V}$$

and $$a = \frac{20,000,000\nu}{V}$$

Again V is the speed of flight equal to or greater than the landing speed.

For the fore body of the wing of Figure 8 the curves of Figure 10 apply but for the portion of the wing aft of the maximum upper camber ordinate the curves of Figure 3 apply because this portion of the wing has an adverse pressure gradient, the maximum suction ordinate lying behind a particle on the flap proceeding to the trailing edge. Hence the distance between the last slot ahead and the first slot behind the maximum ordinate should be determined from Figure 3. In other words a value to insure turbulence would be greater than $$a = \frac{500,000\nu}{V}$$

In Figures 8 and 9 the blower is 7 and it inducts the boundary layer through the slots 14 and 15. This air may be discharged out the ends of the wing or through a slot in either surface of the wing. The discharge duct from the blower is 7a in Figure 8.

The flap is considered in the retracted position when it is substantially in line with the fore body of the wing.

In the large wings it is also desirable to shape the segment of the wing surface between slots so that on it as well as the whole fore body the pressure gradient is the most favorable to the establishment of a laminar flow in the boundary layer. To this end the segments are given a shape similar to that of the fore body. Thus in Figure 8a the contour has the smallest radius of curvature aft of the midpoint of the subchord $a$. That is $k$ is again greater than 0.5. The rise $h$ of the upper camber above its subtending chord for the segment is preferably less than 10 per cent of $a$.

It is a new idea that the provision of a wing section contour of scalloped form, that is composed of arched segments, permits the Reynolds number to be determined from the beginning of each arch. It makes possible the construction of large wings to operate at large Reynolds numbers as regards the whole chord but aerodynamically with Reynolds numbers determined by the length of the extrados only. Since laminar flow can be provided for certain Reynolds numbers there is a great reduction in drag by the use of the proper length extradoses. This is a very important discovery and feature of this invention.

The scalloped contour of the wing also destroys the turbulence in the boundary layer. This may be understood from Figure 1d where the vortex $X_1$ is a form of turbulence in the flow passing through the nozzle $n$. Each particle P of the vortex is in balance between the centrifugal force $F_c$ and the internal suction force $F_s$ and the vortex formation is stable. When the vortex moves to the position $X_2$ the front face of the vortex moves rapidly ahead distorting it. On the contour of shorter radius the centrifugal force will be different than the internal suction force. Hence the vortex will disintegrate and the relative turbulence will decline. The same sort of instability would occur for a vortex moving from the narrow part into the wide part of the nozzle.

Fluid flowing over a wing surface into a concavity would expand and while flowing over the nose of the succeeding arch it would contract. Both actions will serve to maintain a non-turbulent or laminar flow.

In order to have the relative turbulence diminished and the type of velocity gradient corresponding to laminar flow established it is necessary that the flow follow the wing contour into the concavity so that it is expanded and contracted. A properly located slot in the concavity will insure this at all Reynolds numbers. It must however be near enough to the bottom of the concavity actually to insure the flow reaching the bottom. If it is too far away the flow will become eddying and leave the surface. The slot should be nearer the bottom of the concavity than the points of tangency of a line drawn tangent to the adjacent extradoses forming the concavity. If the concavity is open to the seepage of air into it, the flow will not follow into it properly.

It is important that the curvature of the ends of the extradoes be not too steep at any point. The thickness of the aft 10 per cent of the segment determines the abruptness of curvature and the highest point of the extrados should lie ahead of such a point.

The thinness of the wing plays an important role in the drag and lift achievements of this invention. By devising a means of obtaining high lift on a thin wing one advance has been made in drag reduction—that for a given lift. By providing special slot arrangement a second step has been taken. Associated with these drag gains due to the wing thinness is a gain in blower power reduction because the thin nose of the wing facilitates the production of boundary layer turbulence for large displacements of the flap downward. Yet with flap retracted the thin nose favors the maintenance of laminar flow.

In this application all references to the wing chord refer to the chord subtending the mean camber arc of the wing section. The wing thickness or camber height refers to the chord at the same locality. This chord divides the wing into upper and lower parts.

To recapitulate the invention discloses:

A special wing shaped to achieve very low drag; special slot arrangements to further reduce the drag by maintaining a substantially laminar flow.

A wing to obtain very high lifts by means of special flaps and slots in a special wing form.

Means to resolve the incompatibility of a laminar flow for low drag and the turbulent flow in the boundary layer for high lift with low blower power. The devices employed for this embrace:

1. Space the slots along the chord with varying slot widths or areas so that when the flap is down turbulence results due to difference in magnitude of slot areas in the fore body and in the flap. When the flap is down and most of the blower effect is going to the flap slots the fore body slots are not effective so that in effect the Reynolds Number of the flow on the fore body is increased.

2. Provide a wing section shape that favors laminar flow for the fore body and a turbulent flow for the portion aft of the maximum ordinate of the upper surface. The flap shape and attitude and the wing thickness play a part.

It will now be clear that I have disclosed a wing of great novelty and utility since it combines in one wing a means to obtain very high lifting capacity and very low drag with a minimum of energy expenditure by the blower.

In the drawings the thickness of the wing sections are not to scale, since it is difficult to show some of the detail to small scale. The preferred wing section thickness are however from 5 to 15 per cent of the wing chord.

I am aware that through slots have been used in wings, giving a concavity in the lower surface but these are improperly formed for drag reduction and the slot does not lead into the wing interior but to the region above the upper surface of the wing.

It is also recognized that wings displayed on aircraft or in drawings may have somewhat scalloped contours due to faulty workmanship or crude draftsmanship and so the claims have been formulated to exclude these cases which decrease the lift and increase the drag rather than the reverse.

While I have illustrated certain specific forms of the invention it is to be understood that I do not limit myself exactly to these but that I intend to claim my invention broadly as indicated in the appended claims.

I claim:

1. In combination to form a wing, a main body, a flap adjustable from a raised high speed position to a lowered high lift position, the upper contour of said wing section in the raised position of said flap having a main body extrados and a flap extrados, said extradoses forming between them a concavity exterior to the wing section, the maximum depth of said concavity below the tangent to both said extradoses being greater than 5.5 per cent of and less than the tangent length between the said points of tangency, said length of said tangent being substantially greater than 21 per cent of the wing chord length and less than 90 per cent thereof, means to adjust said flap to its said high lift position to produce a great camber of the wing upper surface, the minimum radius of curvature of the said depressed flap extrados which forms a part of the wing upper contour being greater than the maximum thickness of the wing, said concavity having a slot therein opening into the wing interior, and a blower means in substantially closed communication with said interior to induce a flow through the slot, said slot extending along a major portion of the wing semi-span to be significant in altering the lift of the wing.

2. In combination to form a wing, a fore body, a flap adjustable from a raised high speed position to a lowered high lift position, the upper contour of said wing section in the raised position of said flap having a main body extrados and a flap extrados, said extradoses forming between them a concavity exterior to the wing section, the maximum depth of said concavity below the tangent to both said extradoses being greater than 5.5 per cent of and less than the tangent length between the said points of tangency, said length of said tangent being substantially greater than 21 per cent of the wing chord length and less than 90 per cent thereof, means to adjust said flap to its said high lift position to produce a great camber of the wing upper surface of gently changing curvature, the minimum radius of curvature of said depressed flap extrados which forms a part of the wing upper contour being greater than the maximum thickness of the wing, the maximum ordinate of the mean camber line above its subtending chord being substantially greater than 18 per cent of the chord length, said concavity having a slot therein opening into the wing interior, and a blower means in substantially closed communication with said interior to induce a flow through the slot, said slot extending along a major portion of the wing span.

3. In combination to form a wing, a main body, a flap adjustable from a raised high speed position to a lowered high lift position, the upper contour of said wing section in the raised position of said flap having a main body extrados and a flap extrados, said extradoses forming between them a concavity exterior to the wing section, the maximum depth of said concavity below the tangent to both said extradoses being greater than 5.5 per cent of and less than the tangent length between the said points of tengency, said length of said tangent being substantially greater than 21 per cent of the wing chord length and less than 90 per cent thereof, means to adjust said flap to its said high lift position to produce a great camber of the wing upper surface, the minimum radius of curvature of the said depressed flap extrados which forms a part of the wing upper contour being greater than the maximum thickness of the wing, said concavity having a slot therein opening into the wing interior, and a blower means in substantially closed communication with said interior to induce a flow through the slot, said slot extending along a major portion of the wing semi-span to be significant in altering the lift of the wing, said wing section having a maximum thickness substantially less than 20 per cent of the wing chord length.

4. In combination to form a wing, a main body, a flap adjustable from a raised high speed position to a lowered high lift position, the upper contour of said wing section in the raised position of said flap having a main body extrados and a flap extrados, said extradoses forming between them a concavity exterior to the wing section, the maximum depth of said concavity below the tangent to both said extradoses being greater than 5.5 per cent of and less than the tangent length between the said points of tangency, said length of said tangent being substantially greater than 21 per cent of the wing chord length and less than 90 per cent thereof, means to adjust said flap to its said high lift position to produce a great camber of the wing upper surface, the minimum radius of curvature of the said depressed flap extrados which forms a part of the wing upper contour being greater than the maximum thickness of the wing, said concavity having a slot therein opening into the wing interior, and a blower means in substantially closed communication with said interior to induce a flow through the slot, said slot extending along a major portion of the wing semi-span to be significant in altering the lift of the wing, said wing section having a thickness between the trailing edge and the juncture of said extradoses greater than the wing thickness at said juncture.

5. In combination to form a hollow wing a fore body having a plurality of induction slots in its upper surface extending spanwise along a major portion of the wing area, the surface between said slots being substantially smooth and continuous, said wing having its maximum thickness ordinate aft of the mid-point of the chord, said wing having a hollow flap means for supporting said flap in variable relation to said fore body providing for adjustment thereof from a raised high speed position to a lowered high lift position to form therewith a highly cambered wing having an increased negative pressure over said fore body reducing the flow into said slots, said flap having a spanwise slot in its upper surface in communication with its interior, blower means in communication with said slots to induce a flow therethrough into the wing interior to increase the lift, the slots in said fore body being spaced chordwise a distance greater than $$a = \frac{5 \times 10^6 \nu}{V}$$

where V is the landing speed and $\nu$ is the coefficient of kinematic viscosity so as to introduce turbulence into the boundary layer with said reduced slot flow to reduce the power requirement of said blower for lift augmentation with said flap in lowered position, means to raise the flap to reduce the wing camber and the negative pressure over said fore body slots for high speed, said fore body slots being spaced chordwise a distance less than $$a = \frac{20 \times 10^6 \nu}{V}$$

to reduce the drag in said high position by establishing a laminar flow on the major part of the fore body by virtue of the increased inflow induced through said slots by the blower.

6. In combination to form a wing, a hollow fore body having a plurality of induction slots in its upper surface leading into the wing interior, said wing having its maximum thickness ordinate aft of the mid-point of the chord and having a flap, means for supporting said flap for adjustment thereof from a raised high speed position to a lowered high lift position, said flap having a slot in its surface leading into its interior, blower means in communication with said slots to induce an inward flow therethrough, said fore body slots being spaced chordwise at a distance substantially greater than $$a = \frac{5 \times 10^6 \nu}{V}$$

where V is the landing speed and $\nu$ is the coefficient of kinematic viscosity for air, and less than $$a = \frac{20 \times 10^6 \nu}{V}$$

so as to establish a laminar flow with the flap in said high speed position, means to adjust said flap to said high lift position, said slot in the flap being spaced rearward from the last fore body slot a distance substantially greater than that between a pair of adjacent fore body slots to produce turbulence to reduce the power requirement of the said blower means.

7. In combination to form a wing, a wing structure the upper surface of which is defined by a plurality of arched segments disposed chordwise and having an external concavity between two convex extradoses, the maximum ordinate of each segment extrados above a chord line subtending its ends lying substantially aft of the mid point of said chord line of said extrados, the contour of each segment extrados having its smallest radius of curvature aft of the mid-point of the subchord thereof, means forming a slot at the bottom of said concavity leading into the wing interior, and power operated means for inducting inwardly through said slot the boundary layer air on the exposed surface of said extrados forwardly of said concavity to establish substantially laminar flow with reduced drag over the exposed surface of said extrados.

8. In combination to form a wing, a wing structure the upper surface of which is defined by at least two arched segments disposed chordwise and supported in relationship to each other to form a wing having a wing section whose mean camber maximum ordinate above the chord subtending the mean camber arc of the wing section is less than 7 per cent of the chord length so that the wing flow approaches the laminar condition, the arching of the adjacent segments providing a concavity in the wing section upper contour, the curvature of each said segment being such that a favorable pressure gradient is maintained over the forward major portion thereof, said wing having a slot located substantially at the bottom of said concavity, and means in said wing for inducing a flow inwardly through said slot to induct the boundary layer on the exposed wing surface forwardly of said concavity, said segments and said slot serving to lower the drag by establishing a substantially laminar flow on the wing surface.

9. In combination to produce a wing of minimum drag, a wing structure the upper surface of which is defined by at least two arched segments disposed chordwise and defining a wing section whose mean camber maximum ordinate is less than 7 per cent of the chord subtending the mean camber arc of the wing section length and whose lower camber contour lies below the said chord line along a major portion of its length so that the wing flow on the upper surface approaches the laminar condition, the upper extradoses of adjacent said segments being arranged to provide a concavity therebetween in the upper contour, the external contour of said airfoil section being so shaped that the envelope of fair line form contacting said external contour and bridging said concavity is spaced from said arched segments over a substantial portion of said segment length, said wing having a slot in the upper surface substantially at the bottom of said concavity and in communication with the wing interior, and blower means in communication with said interior to induce a flow through said slot to induct the boundary layer air on the rearward portion of the exposed wing surface forwardly of said concavity to lower the drag by establishing a substantially laminar flow on the wing.

10. In an aircraft in combination, an aerodynamic body the upper surface of which is defined by a plurality of arched segments joined streamward to form spaced extradoses, the extradoses of adjacent said segments forming therebetween an exterior concavity in the surface, each said extrados having a maximum ordinate measured relative to the chord subtending its ends and lying substantially aft of the mid point of said chord forming a more abrupt curvature on the trailing portion of said extrados than on the forward portion thereof, means forming an induction slot at the bottom of said concavity, and power operated means for inducting through said slot the boundary layer air on the trailing portion of said extrados ahead of said slot to maintain a laminar flow condition over the outer surface of said body.

11. A low drag wing defined by a negative pressure producing surface comprising a plurality of spaced outwardly extending arched elements separated chordwise by a concavity extending inwardly toward the interior of the wing and below the level of the adjacent wing surface elements, the outwardly extending surface of the element rearward of said concavity projecting farther outwardly beyond the mean camber line than the trailing portion of the element forward of said concavity providing increased velocity of flow of the air stream as it passes thereover, the external contour of said airfoil section being so shaped that the envelope of fair line form contacting said external contour and bridging said concavity is spaced from said arched segments over a substantial portion of said segment length, a slot providing communication from the concavity to the wing interior, and power operated means within said wing interior for withdrawing air through said slot from the wing surface forward of the concavity to impart additional energy to the boundary layer on the surface of said element forward of the concavity, said outwardly projecting surface of said element rearward of the concavity and the increased rearward velocity of flow provided thereby inhibiting reversal of flow of the air stream traveling rearwardly thereover under the action of said slot.

12. A low drag wing defined by a negative pressure producing surface comprising a plurality of spaced outwardly extending elements separated chordwise by a concavity extending inwardly toward the interior of the wing and below the level of the adjacent wing surface elements, the outwardly extending surface of the element rearward of said concavity projecting farther outwardly beyond the mean camber line than the trailing portion of the element forward of said concavity providing rearwardly increasing negative pressure and velocity of flow of the air stream as it passes thereover, the external contour of said airfoil section being so shaped that the envelope of fair line form defined by the rolling of a tangent along said external contour and bridging said concavity is spaced from said arched segments over a substantial portion of said segment length, the maximium thickness of the wing section being located aft of the midpoint of the chord of the wing, a slot providing communication from the concavity to the wing interior, and power operated means within said wing interior for withdrawing air through said slot from the wing surface forward of the concavity to impart additional energy to the boundary layer on the surface of said element forward of the concavity, said outwardly projecting surface of said element rearward of the concavity and the rearwardly increasing negative pressure resulting therefrom inhibiting reversal of flow of the air stream traveling rearwardly thereover under the action of said slot.

13. A high lift low drag wing structure comprising a wing main body, a lift flap, means for securing said lift flap to said main body providing for adjustment thereof from a raised high speed position in substantial alignment therewith to a lowered high lift position at a substantial angle thereto, means forming a plurality of slots located in chordwise spaced relation on the upper surface of said wing structure, blower means for inducting the boundary layer on said wing surface through said slots to produce substantially laminar flow over the entire upper wing surface with said flap in its high speed position, and means for causing the relative wind to follow the surface of said flap and projecting beyond the normal wing surface in the high lift position of said flap for decreasing the effect of said slots on the fore part of said wing in relation to that of the slots on the rear part thereof to induce small scale turbulence on said fore part in said high lift position of said device.

14. A high lift low drag wing structure comprising a wing main body, a lift flap, means for securing said lift flap to said main body providing for adjustment thereof from a raised high speed position in substantial alignment therewith to a lowered high lift position at a substantial angle thereto, means forming a plurality of slots located in chordwise spaced relation on the upper surface of said wing main body, means forming a slot in said flap, blower means for inducting the boundary layer on said wing surface through said slots to produce substantially laminar flow over the entire upper wing surface with said flap in its high speed position, and means projecting beyond the normal wing surface in the high lift position of said flap for increasing the effectiveness of said flap slot relative to that of said wing main body slots to effect increased flow over the rearward portion of said wing structure to cause the relative wind to follow the surface of said flap and decreased flow over the forward portion of said wing structure with resulting production of small scale turbulence of said forward portion.

15. A wing structure comprising a fore body the upper surface of which is defined by a plurality of extradoses in chordwise relation to each other, adjacent extradoses being separated from each other by a concavity extending inwardly toward the interior of the wing and below the level of the adjacent extradoses, said extradoses being defined by curves of radii greater than the thickness of the adjacent wing, said curved surface rearward of said concavity projecting outwardly beyond the level of the trailing end of the surface forward of said concavity providing increased velocity of flow of the air stream as it passes thereover, a lift flap, means for adjustably securing said lift flap at the rearward part of said fore body providing for adjustment thereof from a raised high speed position to a lowered high lift position, the upper surface of said flap being defined by a plurality of extradoses in chordwise relation to each other, adjacent extradoses on said flap being separated from each other by a concavity extending inwardly toward the interior of the wing and below the level of the adjacent extrados, the radii of said flap extradoses being greater than the thickness of the adjacent flap, means forming slots providing communication from said concavities to the wing interior, and means within said wing for withdrawing air through said concavities to impart additional energy to the boundary layer on said surfaces forwardly of said slots.

16. A wing structure comprising a fore body the upper surface of which is defined by a plurality of extradoses in chordwise relation to each other, adjacent extradoses being separated from each other by a concavity extending inwardly toward the interior of the wing and below the level of the adjacent extradoses, said curved surface rearward of said concavity projecting outwardly beyond the level of the trailing end of the surface forward of said concavity providing increased velocity of flow of the air stream as it passes thereover, a lift flap, means for adjustably securing said lift flap at the rearward part of said fore body providing for adjustment thereof from a raised high speed position to a lowered high lift position, means forming a concavity intermediate the rear extrados of said fore body and that of said flap extending inwardly toward the interior of the wing and below the level of the adjacent extradoses, means forming slots providing communication from said concavities to the wing interior and closed to through passage of air from the space above the wing to the space below the same, and means within said wing for withdrawing air through said slots to impart additional energy to the boundary layer on said surfaces forwardly of said slots.

17. A wing structure comprising a fore body the upper surface of which is defined by a plurality of extradoses in chordwise relation to each other, adjacent extradoses being separated from each other by a concavity extending inwardly toward the interior of the wing and below the level of the adjacent extradoses, said curved surface rearward of said concavity projecting outwardly beyond the level of the trailing end of the surface forward of said concavity providing increased velocity of flow of the air stream as it passes thereover, a lift flap, means for adjustably securing said lift flap at the rearward part of said fore body providing for adjustment thereof from a raised high speed position to a lowered high lift position, the upper surface of said flap being defined by a plurality of extradoses in chordwise relation to each other, adjacent extradoses on said flap being separated from each other by a concavity extending inwardly toward the interior of the wing and below the level of the adjacent extradoses, means forming slots providing communication from said concavities to the wing interior and closed to through passage of air from the space above the wing to the space below the same, means within said wing for withdrawing air through said concavities to impart additional energy to the boundary layer on said surfaces forwardly of said slots, and means for differentially adjusting the quantities of air withdrawn through said fore body slots and said flap slots providing for relative increase in the latter when said flap is in its high lift position.

18. In combination to form a wing, a hollow fore body having a spanwise extending slot in its upper surface leading into the wing interior, a flap movably connected to the fore body, means for adjusting said flap from a raised high speed position to a lowered high lift position, said flap having a slot in its upper surface in communication with its interior, the area of said fore body slot in the lowered high lift position of said flap being less than that of said flap slot, blower means within said wing, and means including said blower means for inducting flows through said fore body slot and through said flap slot in correlated relation to induct a lesser flow through said fore body slot than through said flap slot to thereby develop fine grained turbulence on said fore body with the flap in said lowered position while maintaining laminar flow over said wing surface in the high speed position of said flap.

19. In combination to form a wing, a hollow fore body having a spanwise extending slot in its upper surface leading into the wing interior, a flap movably connected to the fore body, means for adjusting said flap from a raised high speed position to a lowered high lift position, said flap having a slot in its upper surface in communication with its interior, blower means within said wing, means including said blower means for inducting flows through said slots, and means for increasing the area of said flap slot in excess of the area of said fore body slot when said flap is in said lowered position to decrease the flow through said fore body slot and to increase the flow through said flap slot to develop fine grained turbulence on said fore body with the flap in said lowered position while maintaining laminar flow over said wing surface in the high speed position of said wing.

20. In combination to form a wing, a hollow fore body having a spanwise extending slot in its upper surface leading into the wing interior, a flap movably connected to the fore body, means for adjusting said flap from a raised high speed position to a lowered high lift position, said flap having a slot in its upper surface in communication with its interior, blower means within said wing for inducting a flow through said slots, a member on the wing surface forwardly of said flap and normally retracted into the wing surface into the high speed position of said flap, and means operable in the lowered position of said flap to effect the projection of said member above said wing surface to promote fine grained turbulence on said surface.

21. In combination to form a wing adapted to have a boundary layer of air form on the surface thereof and having at least two separately cambered sections with a slot in said surface between said sections, said wing surface having a forward wall ahead of said slot and a rearward wall aft of said slot overlapping said forward wall and spaced outward therefrom to form said slot, said slot having its inlet facing upstream, said rearward wall being curved along a major portion of its length and over a substantial extent thereof being spaced inwardly from an envelope of fair line form enclosing and contacting the wing section to produce a favorable pressure gradient over a substantial chordwise length of said rearward wall, and blower means to induct the boundary layer air on said forward wall ahead of said slot into said wing to cooperate with said rearward wall to provide a laminar flow of the boundary layer thereon.

22. A wing structure having an airfoil section composed of at least two outwardly arched segments and terminating in a relatively sharp trailing edge, the radius of curvature of each said segment becoming progressively less toward the rearward portion thereof forming a pressure gradient favorable to the maintenance of laminar flow over the forward major portion of the surface thereof and an adverse pressure gradient over the remaining rearward portion of the surface thereof, means defining a slot in said section between said segments and substantially at the end of the forwardly located one of said segments, said slot extending from the surface of said section to the wing interior, and blower means within said wing interior for inducting through said slot the boundary layer air on the rearward portion of said forwardly located segment to avoid formation of eddies thereon with resulting increased drag.

EDWARD A. STALKER.